W. SELKE.
PROCESS OF PLASTICALLY REPRODUCING OBJECTS.
APPLICATION FILED JAN. 11, 1912.
1,155,011. Patented Sept. 28, 1915.
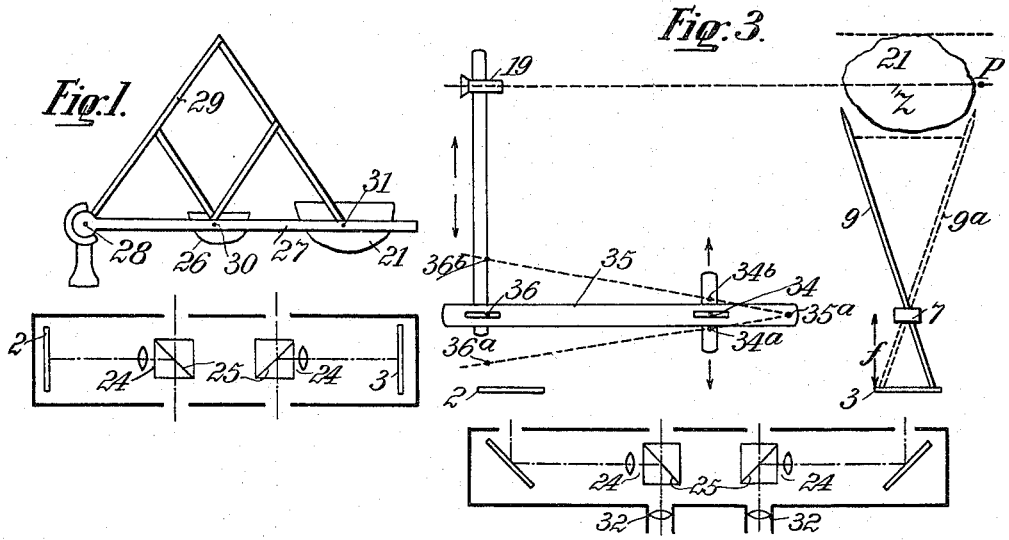
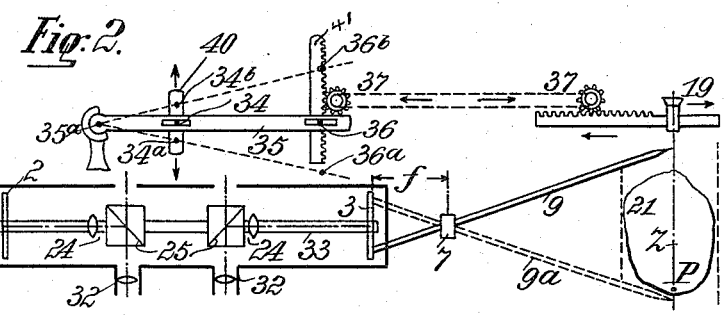
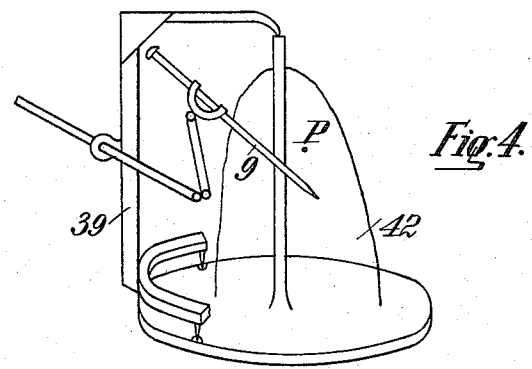
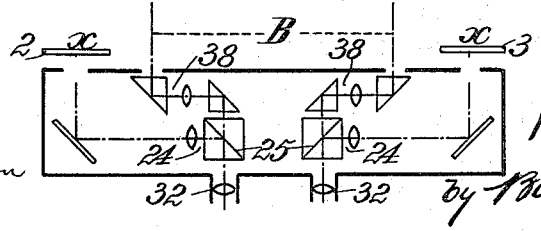

UNITED STATES PATENT OFFICE.

WILLY SELKE, OF BERLIN, GERMANY.

PROCESS OF PLASTICALLY REPRODUCING OBJECTS.

1,155,011.  Specification of Letters Patent. Patented Sept. 28, 1915.

Original application filed December 14, 1910, Serial No. 597,380. Divided and this application filed January 11, 1912. Serial No. 670,575.

*To all whom it may concern:*

Be it known that I, WILLY SELKE, a subject of the German Emperor, and residing at Berlin, Germany, have invented a certain new and useful Improved Process of Plastically Reproducing Objects, of which the following is a specification.

The present invention relates to a process and to apparatus for the direct plastic reproduction of an object from stereoscopic measuring photograms of the said object. When carrying out the new process, a binocular observing instrument, which serves for observing a pair of stereoscopic measuring photograms, and a real, movable mark are employed. This mark serves for feeling over the virtual spatial image of the object, presented to the observer by means of the observing instrument, and is combined with a device adapted to render the movements of the mark available for the plastic reproduction of the object.

For carrying out the process various apparatus can be employed, some of which are shown diagrammatically by way of example in the annexed drawing, in which—

Figure 1 is a plan view of a simple form of such an apparatus according to the invention, Fig. 2 a plan view of a second form, Fig. 3 a plan view of a modification of the apparatus shown in Fig. 2, and Fig. 4 a view partly in plan and partly in perspective of a fourth form of the apparatus.

In Fig. 1 the two measuring photograms 2 and 3 are disposed in two planes, which are parallel to each other, and are looked at by means of a reflector stereoscope, which comprises two reflecting prisms 24, each of which consists of two simple reflecting prisms contacting with each other with their hypotenusal surfaces 25. These hypotenusal surfaces are only thinly silvered, so as to be at the same time reflecting and transparent. Hence, with the aid of these prisms the operator may observe the measuring photograms, while at the same time looking straight ahead into space. On looking into the stereoscope there results for the observer in the well-known manner in consequence of the observation of the photograms 2 and 3 a virtual, spatial image 26, which lies in the object space. This spatial image corresponds (provided that the lenses of the stereoscope have the same focal length as those employed during the exposure of the measuring photograms) in all three dimensions to the object photographed. A measuring mark 30, which lies in the object space, is combined with a device serving for the plastic reproduction. The said device consists of a slide-bar 27, which is journaled in a ball and socket joint or the like 28. With this slide-bar there is combined a pantograph 29, which bears a pin 30 acting as the measuring mark and a tool 31. On looking into the instrument, the observer will see, besides the spatial image, the measuring mark 30 as well, provided that the luminosity of the same is sufficiently great as compared with that of the measuring photograms. On the operator now bringing, while looking into the instrument, the measuring mark 30 into apparent contact with the surface of the spatial image and causing it to move over the said surface, the tool 31 of the reducing device will at the same time transmit the lines traced by the mark to the work-piece consisting of plastic material. The work-piece may differ in its dimensions from those of the spatial image, *e. g.*, as indicated in Fig. 1, it may be greater.

In the constructional example according to Fig. 2 the measuring photograms 2 and 3 are presented to the observer by means of a reflecting stereoscope, which is fitted with magnifying oculars 32 and is otherwise similar to that shown in Fig. 1. The measuring photograms 2 and 3 are positively connected together by known means 33, so that they may be jointly moved in their planes both horizontally and vertically. A directional line carrier, in the present case for example a pointer 9, is positively connected with the measuring photogram 3, which pointer is journaled in a ball and socket joint or the like 7 and is displaceable in its longitudinal direction. A pin 34, which is disposed in the object space and serves as the measuring mark, is fixed to a slide 40, which is displaceable parallel to the measuring photograms, as is indicated by the arrows in the drawing. Parallel to this slide there is disposed a second slide 41, which is displaceable in the same direction and is formed as a rack. The two slides are positively connected together by means of a lever 35, which may be swung in a horizontal plane about its pivotal point 35ª and with which the measuring mark 34 and a pin 36 fixed to the slide 41 engage. A sighting device 19 is fixed to a slide, which is displaceable in a horizontal plane perpendicularly to the direction of motion of the slide 41 and is formed as a rack. The said slide is coupled with the slide 41 by means of a sprocket wheel and chain drive 37. On the observer looking into the instrument, he will again see, besides a spatial image of the object represented on the measuring photograms, the measuring mark 34. On his thereupon setting the two measuring photograms in such a manner, by displacing them horizontally and vertically with the aid of the drive 33, that a point of the spatial image agrees in its position as to breadth and height with the measuring mark, and on his displacing the measuring mark in such a manner that the said point agrees in its depth position as well with the measuring mark, so that, therefore, the said point of the spatial image coincides with the measuring mark, by the displacement of the photograms the pointer 9, which is coupled with the measuring photogram 3, is caused to lie in such a position that it shows the direction in space of the point sought for, and by the displacement of the measuring mark the sighting device 19 is caused to lie in such a position that the vertical plane containing the sighting axis indicates the depth-plane Z, in which the point sought for lies. The point of intersection P of the pointer with this depth-plane is then the point sought for. In a corresponding manner every other point may be determined. As by the magnification effected by the oculars 32 there is caused, as is well known, a diminution of the depth-dimension of the spatial image as compared with its breadth-dimension and its height-dimension, the mark travels, when shifting from one point to another, a less distance in the depth-direction than would correspond to the difference in depth of the two points on the object itself, e. g. only from 34ª to 34ᵇ. Hence, when a reproduction is required, the depth-scale of which agrees with its breadth-scale and its height-scale, the ratio of the distance of the slide 40 from the point 35ª to the distance of the slide 41 from this point and the ratio of gear of the sprocket wheel and chain drive 37 will be so chosen that the movement of the sighting device 19 is correspondingly greater than the movement of the measuring mark. If, for instance, the oculars magnify three times, the distance traveled by the measuring mark would be only a third of the distance, which would equal the corresponding dimension of the object. If, for instance, the distance of the slide 41 from the point 35ª were made three times as great as that of the slide 40 and the drive 37 were given a ratio of gear of one to one, the distance traveled by the sighting device would be three times as great as that traveled by the mark, i. e. would just equal the corresponding dimension of the object. Should it be desired to make a relief, i. e. a reproduction, the depth-dimensions of which are smaller than its breadth-dimensions and height-dimensions, the ratio of the distances of the slides 40 and 41 and the ratio of gear of the gearing 37 are so chosen that the distances traveled by the sighting device become correspondingly less. In a corresponding manner a reproduction may be obtained, the depth-dimensions of which are greater than its breadth-dimensions and height-dimensions. Reproductions, the dimensions of which are all to the same scale, but are smaller than those of the object taken, are obtained, by providing through the suitable choice of the ratio of the distances of the slides 40 and 41 and of the ratio of gear of the gearing 37, that the slide carrying the sighting device 19 shall move, on a movement of the measuring mark taking place, by a less amount than the corresponding depth-dimension of the object amounts to, and by setting the sighting device on its slide in such a manner that it lies nearer to the point of rotation 7 by a corresponding amount than it would during full-size reproductions, so that the depth-plane determined for a point cuts the pointer at a smaller distance from the point 7 than when full-size reproductions are being made. When making reproductions to an enlarged scale, the procedure is altered accordingly.

The apparatus shown in Fig. 3 is substantially the same as and is similarly manipulated to that shown in Fig. 2. It differs from it only by the measuring photograms lying in one plane. In consequence of this the sprocket wheel and chain drive of Fig. 2 become superfluous.

In the fourth example, Fig. 4, a microscope-stereoscope again serves for the observation of the measuring photograms 2 and 3, such as is used in the examples according to Figs. 2 and 3. The measuring mark is formed by the pointed end of a pointer 9, which is connected with a device 39 for locating points. Two objectives 38 each form with the aid of reflecting prisms placed before and behind them an image of the measuring mark in the image-plane of the oculars 32. The oculars, therefore, act both as the oculars of the microscope-stereoscope serving for the observation of the measuring photograms and as the oculars of a binocular telescope for the observation of the measuring mark. If the luminosity of the measuring photograms and that of the mark are properly balanced, the measuring mark will be seen simultaneously with the spatial image. By feeling over the spatial image with the measuring mark the point in space belonging to two corresponding points of the measuring photograms may again be determined and may be transferred by means of the device 39 to a suitable material. Instead of single points lines may be transferred to the work-piece, if the device 39 be suitably modified. The ratio, which in the spatial image of the object the depth-scale bears to the breadth-scale and the height-scale, depends on the power of the system for observing the measuring photograms (hence, only on the power of the oculars, when the microscope objectives form images of the measuring photograms in the planes of the oculars with the magnification one). The spatial position, in which the measuring mark apparently lies, on observing it through the telescope, depends on the power of the telescope and the relative distance of its two axes: the former value influences the ratio, which the dimension of the apparent depth-position of the measuring mark bears to that of its apparent breadth-position and height-position, while the latter value influences the ratio, which the apparent breadth-position bears to the true breadth-position and the apparent height-position bears to the true height-position. The ratio, which the dimensions of the reproduction bear to those of the original and to one another, may, therefore, be influenced by the choice of the power of the microscope-stereoscope, of that of the telescope and of the relative distance of the entrance axes of the telescope. Thus, for example, when the power of the microscope-stereoscope is the same as that of the telescope and the entrance axes of the telescope have a relative distance, which is equal to that of the objectives used during the taking of the measuring photograms, a reproduction is obtained, which agrees with the original in all three dimensions. If, however, for example, while retaining the relative distance of the entrance axes of the telescope, the telescope be given a less power than that possessed by the microscope-stereoscope, there results a reproduction, which, as regards its face-dimensions, agrees with the original, the depth-dimensions of which, however, are reduced as compared with those of the original, so that the reproduction is a relief. If, on the other hand, while retaining the agreement between the powers of the two instruments, the entrance axes of the telescope be given a relative distance, which is greater than that of the objective axes during the taking of the measuring photograms, there results a reproduction, which is reduced uniformly in all three dimensions as compared with the original. In a corresponding manner a uniformly enlarged reproduction may be obtained or a reproduction in relief, which differs from the original in its face-dimensions as well. It is essential with the form shown in Fig. 4, that two objectives form two images of the measuring mark, which images are observed together with the two measuring photograms. It is not essential, that the images of the measuring mark fall on images of the measuring photograms (as is shown in the drawing); with the device suitably modified, the measuring photograms might be also disposed in the image-planes of the objectives and the images of the measuring mark be thus caused to fall directly on the measuring photograms.

I claim:

1. Process for the plastic reproduction of an object from two stereoscopic measuring photograms, consisting in presenting by means of a binocular observing instrument a spatial image of the object and in feeling over the said spatial image by means of a real, movable measuring mark disposed in the object space, which mark is combined with a device adapted for the plastic reproduction of the said object.

2. In an apparatus for the plastic reproduction of an object two stereoscopic measuring photograms of the said object, a real, movable measuring mark, optical means for producing from the said photograms a spatial image of the said object and for observing simultaneously the said spatial image and the said mark, which latter is disposed in the object space, and means for plastically reproducing the said object, the said mark and the said latter means being adapted to coöperate.

3. In an apparatus for the plastic reproduction of an object two stereoscopic measuring photograms of the said object, a real, movable measuring mark, two objectives, each adapted to form an image of the said mark, optical means for simultaneously producing from the said photograms a spatial image of the said object and from the said mark images a spatial image of the said mark and for observing simultaneously the said two spatial images thus produced and means for plastically reproducing the said object, the said mark and the said latter means being adapted to coöperate.

4. In an apparatus for the plastic reproduction of an object two stereoscopic measuring photograms of the said object, a real, movable measuring mark, a microscope-stereoscope for producing from the said photograms a spatial image of the said object, the said mark being disposed in the object space, a binocular telescope for observing the said mark, the said stereoscope and the said telescope having their oculars in common, and means for plastically reproducing the said object, the said mark and the said latter means being adapted to coöperate.

In testimony whereof, I affix my signature in the presence of two witnesses.

WILLY SELKE.

Witnesses:
HENRY HASPER,
WOLDEMAR HAUPT.